(12) United States Patent
Michishita et al.

(10) Patent No.: US 12,497,668 B2
(45) Date of Patent: Dec. 16, 2025

(54) HOT METAL PRODUCTION FROM DRI WITH ELECTRIC ARC HEATING

(71) Applicants: Midrex Technologies, Inc., Charlotte, NC (US); Kobe Steel, Ltd., Kobe (JP)

(72) Inventors: Haruyasu Michishita, Charlotte, NC (US); Koji Tokuda, Kobe (JP); Tsuyoshi Mimura, Kobe (JP); Katsuma Fujiwara, Kobe (JP)

(73) Assignees: Midrex Technologies, Inc.; Kobe Steel, Ltd., Kobe (JP)

( * ) Notice: Subject to any disclaimer, the term of this patent is extended or adjusted under 35 U.S.C. 154(b) by 365 days.

(21) Appl. No.: 18/118,355

(22) Filed: Mar. 7, 2023

(65) Prior Publication Data

US 2023/0287528 A1    Sep. 14, 2023

Related U.S. Application Data

(60) Provisional application No. 63/318,935, filed on Mar. 11, 2022.

(51) Int. Cl.
*C21B 13/12* (2006.01)
*C21B 13/00* (2006.01)

(52) U.S. Cl.
CPC ............ *C21B 13/12* (2013.01); *C21B 13/002* (2013.01); *C21B 2100/60* (2017.05); *C21B 2300/02* (2013.01)

(58) Field of Classification Search
CPC ... C21B 13/12; C21B 13/002; C21B 2100/60; C21B 2300/02; C21B 2100/22; C21B 2100/26; C21B 2100/44; C21B 2100/64; C21B 2100/66; C21B 13/0073; C21B 13/02; C21B 13/14; C21C 5/527
USPC .................................................. 75/10, 10.63
See application file for complete search history.

(56) References Cited

U.S. PATENT DOCUMENTS

| | | |
|---|---|---|
| 4,661,150 A | 4/1987 | Bates et al. |
| 5,802,097 A | 9/1998 | Gensini et al. |
| 6,379,424 B1 | 4/2002 | Dry |
| 6,524,362 B1 | 2/2003 | Eichberger et al. |
| 2003/0000338 A1* | 1/2003 | Shver ............... C21C 5/462 75/10.41 |
| 2004/0060389 A1* | 4/2004 | Roth ............... C21B 13/14 75/10.41 |
| 2005/0179174 A1* | 8/2005 | Gordon ............ C21C 5/567 266/161 |
| 2018/0274047 A1 | 9/2018 | Memoli et al. |

(Continued)

OTHER PUBLICATIONS

Stal et al. "Electromagnetic stirring in electric arc furnace," Prod. Int. Conf. Innovation in EAF and in Steelmaking Processes, Italian Association of Metallurgy, May 27-29, 2009 (Year: 2009).*

(Continued)

*Primary Examiner* — Danielle M. Carda
(74) *Attorney, Agent, or Firm* — Clements Bernard Walker; Christopher L. Bernard; Devin Cummins

(57) ABSTRACT

According to embodiments, disclosed is a method and system to maintain the soft and sparse slag characteristic favorable for an electric arc to efficiently transfer the energy to molten iron with the power input per furnace area higher than 600 KW/m2 while keeping FeO amount less than 5% in the slag and carbon amount higher than 2.5% in the product hot metal at a DRI melting furnace.

11 Claims, 3 Drawing Sheets

(56) References Cited

U.S. PATENT DOCUMENTS

2021/0301359 A1* 9/2021 Astoria .............. C21B 13/0073

OTHER PUBLICATIONS

Midrex, "The versatile OBM (Ore-based Metallic): Part 1—Everything you ever wanted to know about Direct Reduced Ironâ;but were afraid to ask!", online article published Mar. 2016 (Year: 2016).*
International Search Report issued in corresponding International Application No. PCT/US23/14776.

* cited by examiner

HOT METAL PRODUCTION FROM DRI WITH ELECTRIC ARC HEATING

CROSS-REFERENCE TO RELATED APPLICATION

The present non-provisional patent application claims the benefit of priority of U.S. Provisional Patent Application No. 63/318,935, filed on Mar. 11, 2022, and entitled "Hot Metal Production from DRI with Electric Arc Heating," the contents of which are incorporated in full by reference herein.

TECHNICAL FIELD

The present disclosure relates generally to the direct reduced iron (DRI) and steelmaking fields, where DRI is commonly understood to include cold direct reduced iron (CDRI), hot direct reduced iron (HDRI), and hot briquetted iron (HBI). More specifically, the present disclosure relates to a method and system to produce hot metal from the DRI with electric arc heating, such as with an electric arc furnace (EAF), while maintaining high overall energy efficiency and productivity.

BACKGROUND

The blast furnace (BF)—basic oxygen furnace (BOF) process route has been the most predominant method globally for producing crude steel, but is a major source for CO2 emissions. Steelmaking with an electric arc furnace (EAF) using scrap is a prospective alternative to the BF-BOF process due to its lower CO2 emission intensity. However, high-quality steel product equivalent to what is commonly termed BF grade product restricts the amount of tramp element such as copper derived from the scrap. For EAF to meet the quality requirement, clean iron units such as DRI and/or pig iron are commonly added to the scrap in EAF feedstock to dilute the amount of the tramp material or may be the principal feedstock to EAF with little scrap addition.

In the case of high grade DRI made from the high-quality iron ore, termed DR grade iron ore, typically containing iron content >67%, the DRI can be fed to the EAF to produce liquid steel. This process has been most practiced, but the depletion of the DR grade iron ore is an issue in the long term, and especially can become a serious issue as more productions shift from BF-BOF to EAF to lower CO2 emission. However, in the case of low grade DRI made of the lower quality iron ore containing more acid gangue fed to the EAF to produce the liquid steel, the operating and capital cost in melting the DRI would be higher. More acid gangue requires more flux addition at the EAF which increases the slag volume, iron loss as FeO in the slag, and electricity consumption. The higher amount of slag and the electricity consumption can result in lower productivity and larger equipment to maintain the melting capacity.

The lower quality iron ore typically containing iron content <65% is applicable at a two-step BF-BOF process since the hot metal is produced to remove the slag at the middle step and maintain the higher iron yield. Similar to the BF-BOF process, a two-step process could be applied for the conventional electric melter such as EAF and SAF (Submerged Arc Furnace) to produce the hot metal and thereafter decarburize the hot metal in producing the liquid steel with the low grade DRI. However, these electric melters have the below issues in producing the hot metal.

SAF melts the DRI taking the joule heating mechanism of the thick slag layer, but the input power density for SAF (less than 300 kw/m2) is lower than that for the conventional EAF (higher than 2000 kw/m2). Accordingly, the productivity with the SAF is lower than EAF even though the large SAF is applied. The lower productivity tends to require a greater number of melting furnace units or large size melting furnaces. It is difficult for the several units of the large SAF to be located below the shaft furnace to feed hot DRI directly to the electric melters through the chute by gravity. The larger footprint of the SAFs requires long hot DRI transfer conveyors from the shaft furnace to SAFs, which causes the additional temperature and quality drop with the hot DRI, as well as a higher capital investment.

An EAF employing the arc heating mechanism typically requires a smaller furnace area and makes the electric melting furnace significantly compact compared to the SAF. However, there is an issue as to how to achieve the higher power density without the foamy slag commonly made in producing the liquid steel, but difficult to make in producing the hot metal. The denser and thinner slag would significantly reduce the energy efficiency due to 1) insufficient coverage of the electric arc by the thin slag and 2) obstruction or reflection of the electric arc by the dense slag. These prevent the electric arc from being efficiently transferred to the molten iron underneath the slag, increase the heat load or could cause the damage for the casing of the electric melting furnace.

Furthermore, there is no mechanism to enhance the mixing or stirring of the molten iron to achieve the high carburizing efficiency in the conventional EAF or SAF. This is an issue with the smaller size EAF having much shorter residence time compared to the SAF and BF. This results in a lower yield of the carbon in DRI and requires more external carbonaceous additives such as coke breeze. The unreacted carbon floating on the molten iron will be captured in the slag and either oxidized by the oxidant in the furnace atmosphere or discharged from the electric melting furnace with the slag. To cope with the low carbon yield, it is required to provide more additional carbonaceous additives, which increases the operating cost.

BRIEF SUMMARY OF THE INVENTION

Therefore, in order to employ an EAF type DRI melting furnace, which is desirably smaller in size than, e.g., a SAF, in producing the hot metal such as with lower grade DRI, it is desired to develop a melting operation method and system to address the issues mentioned above; non-foamy denser and thinner slag characteristic and poor mixing performance of the carbon material dispersed in the hot metal and slag, without increasing the amount of FeO in the slag and maintaining the carbon content in the hot metal. Embodiments of the disclosure address the foregoing problems and others.

Exemplary embodiments of the present invention disclose a method and system to produce the hot metal with the DRI resulting in improved processing and addressing the issues noted above. Advantageously, an overall benefit is for melting the DRI made from a wider range of iron ores, especially lower quality iron ores containing the acid gangues content higher than DR grade iron ore, while maintaining high overall energy efficiency, material yield and productivity.

Thus, in order to produce the first melting step of DRI to produce the hot metal with the lower operation cost and higher productivity using a smaller DRI melting furnace, the following objectives and advantages are achieved by embodiments of the invention: 1) achieve a higher input power density in transferring the electric energy to the molten iron underneath the slag without the foamy slag; and 2) enhance the mixing or stirring of the molten iron and slag to achieve the high carburizing efficiency in DRI melting furnace.

In an exemplary embodiment, the present invention discloses a method to maintain a soft and sparse slag characteristic favorable for an electric arc furnace to efficiently transfer energy to molten iron with a power input per furnace area higher than 600 KW/m2 while maintaining a FeO amount less than 5 wt. % in the slag and a carbon amount higher than 2.5 wt. % in a product hot metal at a direct reduced iron (DRI) melting furnace, comprising: providing an electric DRI melting furnace as an electric arc furnace and including a plurality of electrodes for electric arc heating; charging the DRI to the DRI melting furnace through a chute; charging lumpy carbonaceous material fed along with the DRI; forming a slag layer comprising slag and forming a layer of molten iron below the slag layer; providing at least one oxygen injection nozzle for injection of oxygen; injecting the oxygen into the slag layer not penetrating the slag or reaching the molten iron from the at least one oxygen injection nozzle; adjusting oxygen flow rate to stabilize current fluctuation for each electrode; discharging the slag through a slag door or a slag tap hole located at an intermediate elevation of a side wall of the DRI melting furnace; and discharging the product hot metal through a tap hole located at a bottom or lower portion of the DRI melting furnace; wherein the method maintains the soft and sparse slag characteristic favorable for the electric arc furnace to efficiently transfer energy to the molten iron with a power input per furnace area higher than 600 KW/m2 while maintaining the FeO amount less than 5 wt. % in the slag and the carbon amount higher than 2.5 wt. % in the product hot metal at the DRI melting furnace. The method can comprise providing multiple injection nozzles circumferentially laid out around the furnace and wherein the oxygen is injected with a sub-sonic gas velocity toward the electrodes from the injection nozzles. The oxygen flow rate can be controlled to maintain a noise level below 90 dB at the DRI melting furnace. The amount of the lumpy carbonaceous material can be more than 30 kg of carbon left in the slag per 1 ton of molten iron. Pulverized carbonaceous material or natural gas can be injected in the slag together with the oxygen. The amount of carbon or natural gas can be equal or more than the stoichiometric amount to the oxygen in the combustion reaction forming CO2. The elevation of the slag upper portion is maintained above the elevation of the slag tapping hole or the bottom end of the slag door while the slag is discharged, to prevent the carbonaceous material floating in the liquid slag from being discharged with the slag from the DRI melting furnace. Combustible gas such as natural gas, reducing gas or inert gas such as nitrogen can be injected to stir the molten iron to enhance mixing and replace some of the carbonaceous material fed along with the DRI to efficiently carburize the molten iron. The molten iron can be stirred by an electromagnetic stirrer during the hot metal production. The DRI can be made from iron ore containing an iron content <65 wt. %.

In another exemplary embodiment, the present invention discloses a method of producing a product hot metal from DRI using electric arc heating comprising: charging the DRI along with lumpy carbonaceous material to an electric DRI melting furnace through at least one chute; forming a slag layer comprising slag and forming a layer of molten iron below the slag layer; injecting oxygen into the slag layer not penetrating the slag or reaching the molten iron from the multiple injection nozzles circumferentially laid out; discharging the slag through a slag door or a slag tap hole located at an intermediate elevation of a side wall of the furnace; and discharging the product hot metal through a tap hole located at a bottom or lower portion of the DRI melting furnace; wherein the method further comprises maintaining a soft and sparse slag characteristic favorable for an electric arc to efficiently transfer energy to the molten iron with a power input per furnace area higher than 600 KW/m2 while maintaining a FeO amount less than 5 wt. % in the slag and a carbon amount higher than 2.5 wt. % in the product hot metal at the DRI melting furnace.

In another exemplary embodiment, the present invention discloses a system configured to maintain a soft and sparse slag characteristic favorable for an electric arc furnace to efficiently transfer energy to molten iron with a power input per furnace area higher than 600 KW/m2 while maintaining an FeO amount less than 5 wt. % in the slag and a carbon amount higher than 2.5 wt. % in a product hot metal at direct reduced iron (DRI) melting furnace. The system comprises: an electric DRI melting furnace as an electric arc furnace and including a plurality of electrodes for electric arc heating; a chute configured to charge therethrough the DRI along with lumpy carbonaceous material to the DRI melting furnace through the chute; wherein the system is configured to form a slag layer comprising slag and a layer of molten iron below the slag layer; at least one oxygen injection nozzle configured to inject oxygen into the slag layer not penetrating the slag or reaching the molten iron from the at least one oxygen injection nozzle; an oxygen adjustor configured to adjust oxygen flow rate to stabilize current fluctuation for each electrode; a slag door or a slag tap hole located at an intermediate elevation of a side wall of the DRI melting furnace configured to discharge the slag; and a tap hole located at a bottom or lower portion of the DRI melting furnace configured to discharge the product hot metal. The system is configured to maintain the soft and sparse slag characteristic favorable for the electric arc furnace to efficiently transfer energy to the molten iron with a power input per furnace area higher than 600 KW/m2 while maintaining the FeO amount less than 5 wt. % in the slag and the carbon amount higher than 2.5 wt. % in the product hot metal at the DRI melting furnace. The system can comprise multiple injection nozzles circumferentially laid out around the furnace and wherein the oxygen is configured to be injected with a sub-sonic gas velocity toward each electrode from the injection nozzles. The amount of the lumpy carbonaceous material can be more than 30 kg of carbon left in the slag per 1 ton of molten iron. Pulverized carbonaceous material or natural gas can be configured to be injected in the slag together with the oxygen. The amount of carbon or natural gas can be equal or more than the stoichiometric amount to the oxygen in the combustion reaction forming CO2. The elevation of the slag upper portion can be maintained above the elevation of the slag tapping hole or the bottom end of the slag door while the slag is discharged, to prevent the carbonaceous material floating in the liquid slag from being discharged with the slag from the DRI melting furnace. Combustible gas such as natural gas, reducing gas or inert gas such as nitrogen can be configured to be injected to stir the molten iron to enhance mixing and replace some of the carbonaceous material fed along with the DRI to efficiently carburize the molten iron. The system can further comprise an electromagnetic stirrer configured to stir the molten iron. The DRI can be made from iron ore containing an iron content <65 wt. %.

BRIEF DESCRIPTION OF THE DRAWINGS

The present disclosure is illustrated and described with reference to the various drawings, in which like numbers are used to denote like method steps/system/apparatus components, as appropriate, and in which.

DETAILED DESCRIPTION OF THE INVENTION

Figure 1:
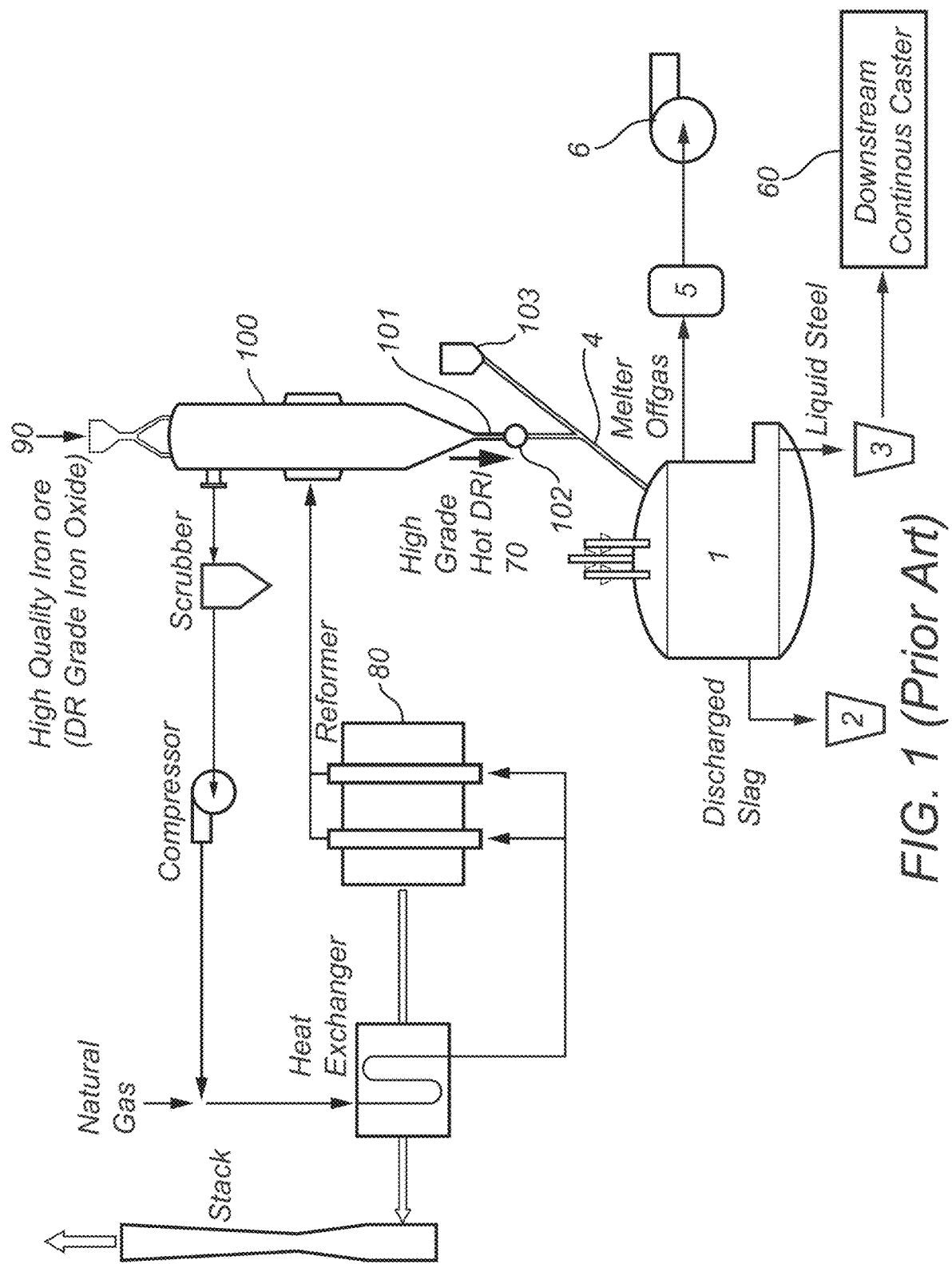
FIG. 1 is a schematic diagram illustrating a configuration of a direct reduction plant integrated with a conventional EAF to melt the DRI in producing the liquid steel.

In melting low grade DRI made of a lower quality iron ore containing more acid gangue, such as integrated steel mills employ with conventional BF-BOF processes, it is advantageous to apply a two-step process; firstly producing the hot metal after melting the DRI and removing the slag, and secondarily decarburizing the hot metal to produce the liquid steel in a separate melting furnace downstream. The first melting step of DRI can be similar to what the conventional blast furnace (BF) practices; i.e., producing the hot metal with the lower grade iron ore under the reducing atmosphere to maintain FeO %<1% in the slag and the slag basicity of about 1.0 to 1.3. The hot metal containing high carbon (typically >4%) enables the BF to increase the iron yield and lower energy consumption since the higher carbon lowers the hot metal melting temperature and decreases FeO % content in the less amount of slag with the lower slag basicity.

It is noted that U.S. Pat. No. 4,661,150 discloses a method to melt the highly metallized hot DRI in producing the hot metal with an electric melting furnace, SAF, where the electrode is submerged in the slag layer using a heat transfer mechanism through the resistant heat of the slag. However, the thermal efficiency or input power density is low due to the indirect heat transfer from the electrode to the metal through the low voltage joule heating of the slag. In general, the input power density for the SAF is less than 300 kw/m2 with the low voltage slag joule heating while that for the conventional EAF is higher than 2000 kw/m2 with the direct heat transfer from the electrode to the metal through the high voltage electric arc. Accordingly, the productivity is lower, and a greater number of furnace units is required with the SAF than with the EAF, even though the largest size SAF with many electrodes is applied. It is challenging to layout the several units of the large SAF below the shaft furnace so that the hot DRI from the shaft furnace can be directly fed to DRI melting furnace through the gravity chute, unlike the case of a conventional EAF producing liquid steel. The larger footprint for the several larger SAFs requires several long hot DRI transfer conveyors from the shaft furnace to SAFs, which causes a temperature and quality drop with the hot DRI (metallization/carbon deterioration by reoxidation of DRI), as well as a higher capital investment for the transfer conveyors.

Additionally, it is noted that the EAF is more compact due to the higher input power density, as well as easier to layout close to a direct reduction plant. However, a conventional EAF producing liquid steel with the scrap or high grade DRI containing less acid gangue cannot be simply applied for the hot metal production with low grade DRI. EAF achieves the higher power density with the foamy slag which is sparse enough for the electric arc to penetrate through the slag, but largely expanded enough to cover the electric arc to prevent splashing. EAF slag has the characteristic favorable to produce the foamy consistency with FeO %>20% and the basicity=1.8~2.0 at a high temperature >1600° C., which enables the production of the foamy slag with the oxygen and pulverized coal injection. However, in producing the hot metal with the low grade DRI, the slag has the different characteristic under the lower temperature 1450~1550° C. with lower FeO % 5%) and basicity (1.0~1.5), which is not favorable to make it foamy. Oxygen is not injected to maintain FeO <5% in the slag and carbon=2.5~4.5% in the hot metal. Then, the non-foamy slag under the lower temperature is too hard and dense for the electric arc to penetrate through. The electric arc will be reflected by the slag and splash to the furnace casing, or intermittently obstructed by the slag and make the unstable arc formation which decreases the energy efficiency and sometimes damages the furnace refractory casing.

Furthermore, another issue addressed by the herein embodiments is the poor carburizing efficiency of the hot metal in producing the hot metal with EAF. The carbon in DRI, typically C=1~3%, needs to be made up to achieve a carbon amount of >2.5% in hot metal since 1~1.5% carbon in DRI is consumed to reduce the remaining FeO in the DRI of which the metallization of the DRI is normally 93~96%. Iron in the DRI ought to be carburized during the melting process with the carbon in DRI and the externally added carbonaceous material such as coke breeze at the DRI melter. Especially, it is difficult to achieve the good carburization efficiency with the externally added carbon in the smaller size of an EAF having the shorter residence time in comparison with the BF and SAF. This results in the lower yield of the externally added carbonaceous material or more carbon addition required. No mechanism exists to enhance mixing or stirring of the molten iron and slag to achieve the high carburizing efficiency within a shorter residence time at the EAF. The operation improvement of the conventional EAF to produce the low carbon liquid steel is driven by higher DRI melting capacity, but not carburizing reaction.

US Pat. Appln. Publ. No. US2018/0274047 discloses a method to produce pig iron to melt the DRI with EAF subjected to a positive internal pressure generated by gases produced by reduction reaction taking place in the EAF. Furthermore, US Pat. Appln. Publ. No. US2021/0301359 discloses a method to produce the hot metal with EAF, realizing the positive pressure or reducing atmosphere by introducing the reducing gas from the shaft furnace. These publications have addressed how to maintain the reducing atmosphere during melting the DRI with the EAF, but not the above issues; how to achieve the high input power density, the foamy slag and the higher carburization efficiency with the externally added carbonaceous material in producing the hot metal at the EAF.

Generally, a DR plant reduces the iron ore to produce DRI using natural gas as the reductant source, where the oxygen is removed from the iron oxide, but the gangue remains in the product DRI.

Referring now to FIG. 1, FIG. 1 shows an exemplary flowsheet/schematic for the combination of a direct reduction plant and an EAF. The high quality iron ore 90 termed DR grade iron ore, typically containing iron content >67%, is fed to shaft furnace 100. The reducing gas supplied from reformer 80 which reforms CO2 and H2O in the recycled gas from shaft furnace 100 using natural gas, reduces the iron ore to produce the high grade hot DRI 70 discharged from the bottom of shaft furnace 100. The hot DRI 70 is transferred from shaft furnace 100 to EAF 1 located underneath by gravity feed through feed leg 101, rotary feeder 102 and EAF feed chute 4, so that EAF 1 can receive the hot DRI 70 and melt to produce the liquid steel in an efficient way. The DRI feed rate is regulated by the rotary feeder 102 to match the melting demand or capacity of EAF 1 and maintain the packed material bed in the feed leg 101 to form the material seal to isolate the EAF 1 from the pressurized shaft furnace. N2 or other inert gas can also be injected into the feed leg 101 to help provide the dynamic sealing. A controlled amount of additives, such as additional cold DRI and/or basic flux, can also be added through a separate additive feed hopper with feed system 103 to EAF 1 feed chute 4 according to demands of the cold DRI feed rate and flux feed rate to control the slag chemistry. The regulated amount hot DRI together with the additional additives are fed to EAF 1 through EAF feed chute 4.

With further reference to FIG. 1, EAF 1 melts the hot DRI 70 and discharges the liquid steel to the liquid steel ladle 3 and the slag to the slag pot 2. The product liquid steel in the liquid steel ladle 3 is transferred to the downstream process such as a steel refining system (SRS) or continuous caster (CC) 60. Offgas from EAF 1 is processed with an offgas handling system comprising a bag filter or scrubber 5 followed by ID fan 6 to be discharged to the ambient.

Figure 2:
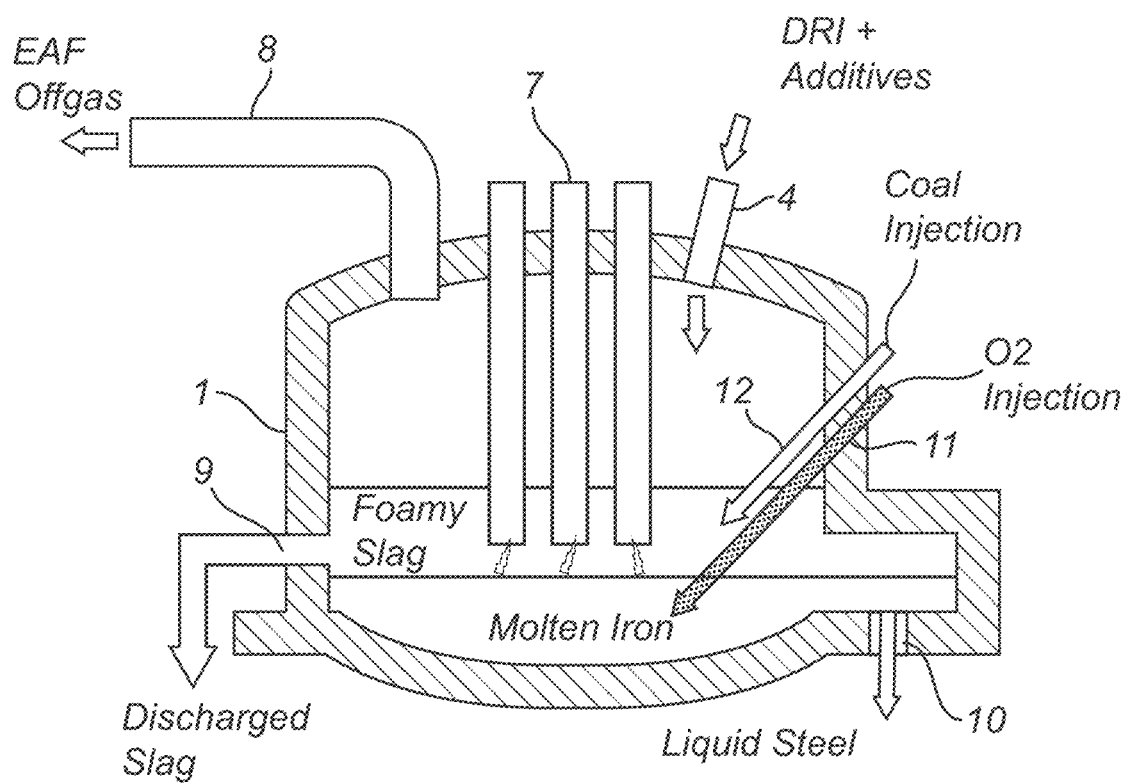
FIG. 2 is a schematic diagram illustrating the operation at a conventional EAF to melt the DRI in producing the liquid steel.

Referring now to FIG. 2, FIG. 2 shows the detail operation condition using a conventional EAF also included in FIG. 1. DRI and additives are fed to EAF 1 through EAF feed chute 4. Product liquid steel (liquid iron product having lower carbon normally lower than 1%) is discharged through the metal tap hole 10 located at the bottom of EAF 1. Slag is discharged through either the slag door or the slag tap hole 9 located on the side wall of EAF 1. Electric energy is transferred from the electrodes 7 to the molten iron (liquid iron semi-product made of the melted DRI liquid steel) in the form of an electric arc jet. Offgas from the EAF 1 is discharged through the EAF exhaust duct 8 and transferred to an offgas handling system. Oxygen is injected through the oxygen lance 11 to penetrate the slag and reach the molten iron bath to oxidize the iron to produce FeO. This provides two major benefits; one is the additional thermal energy in oxidizing the iron and another is making the foamy slag. Carbonaceous material such as the pulverized coal simultaneously injected through the carbon injection lance will react with either the injected oxygen or the oxidized iron (FeO) to form CO gas. It is commonly known and practiced that the slag having the amount of FeO about 20% is favorable to make the foamy slag since FeO reduces the surface tension of the molten iron and enables the slag to hold small CO bubbles. This foamy slag expands the slag volume large enough to cover the electric arc to prevent the electric arc from emitting the radiation heat out of the slag. The slag containing CO bubbles is sparse enough for the electric arc to penetrate the slag and be transferred to the molten iron.

However, conventional operation practice with the foamy slag cannot be applied in producing the hot metal with the DRI since low FeO in slag <5%, preferably FeO<3%, should be maintained in producing the hot metal containing the carbon >2.5%. This becomes an even greater issue in the case of applying the low grade DRI containing more acid gangues, because the slag layer becomes thicker and denser. The electric arc has more difficulty in penetrating the slag due to the reflection by the solid slag. Therefore, the conventional EAF operation condition cannot be applied for the production of the hot metal, and especially with low grade DRI.

Figure 3:
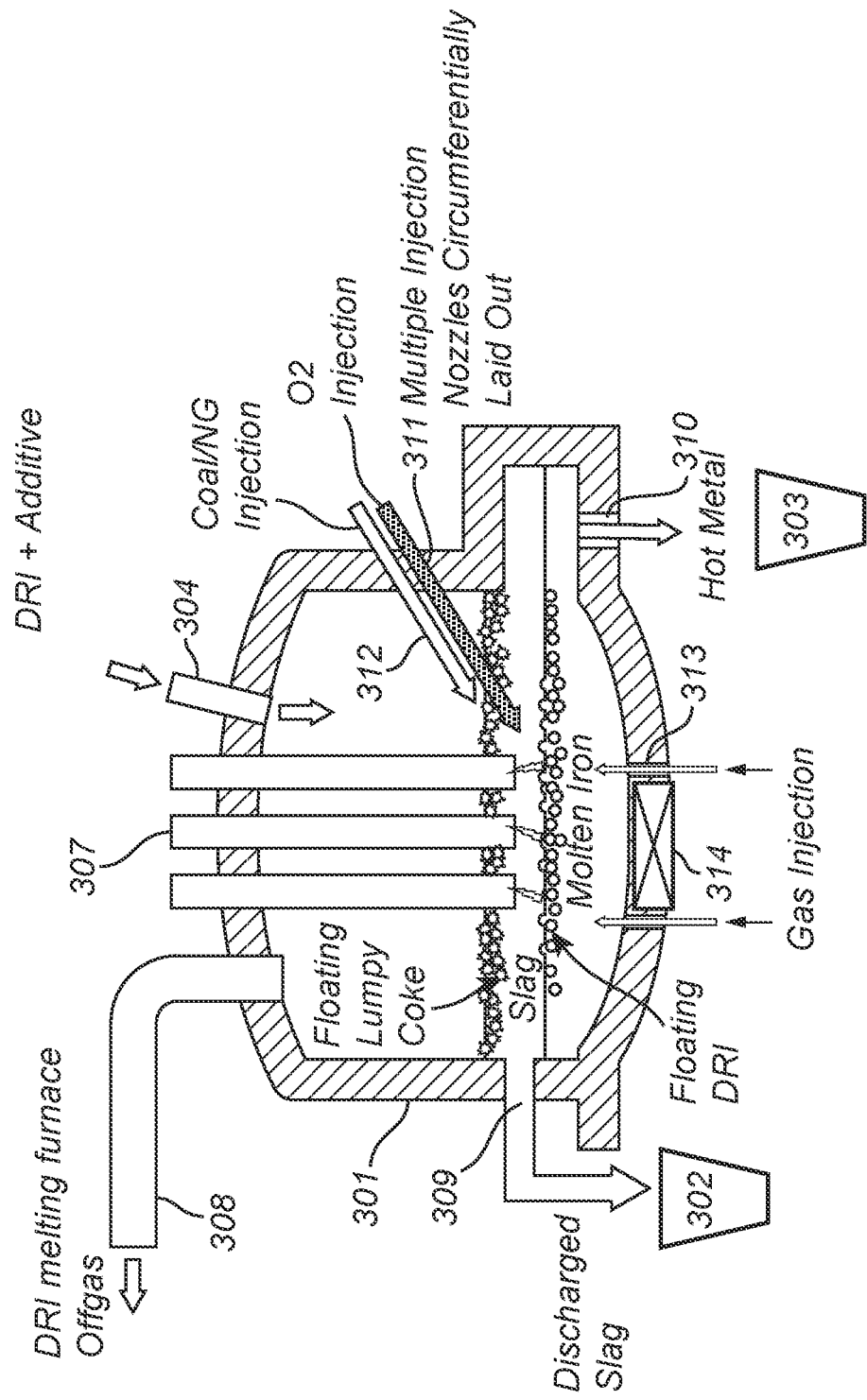
FIG. 3 is a schematic diagram illustrating one exemplary embodiment of the DRI melting process and system of the present disclosure in producing the hot metal.

Referring now to FIG. 3, FIG. 3 shows one exemplary embodiment of the DRI melting process and system of the present disclosure in producing the hot metal (liquid iron product having higher carbon, normally higher than 2.5%) with DRI melting furnace 301 using an electric arc heat transfer mechanism. A controlled amount of DRI and additives, as well as lumpy carbonaceous material, are fed to the DRI melting furnace 301 through DRI melting furnace feed chute 304. Product hot metal is discharged to the hot metal ladle 303 through the metal tap hole or port 310 located at the bottom or lower portion of the DRI melting furnace 301. Slag is discharged to the slag pot 302 through either the slag door or the slag tapping hole or port 309 located at an intermediate elevation of the side wall of the DRI melting furnace 301. Electric energy is transferred from the electrodes 307 to the molten iron (liquid iron semi-product made of the melted DRI) in the form of an electric arc jet. Offgas from the DRI melting furnace 301 is exhausted through DRI melting furnace exhaust duct 308 and transferred to an offgas handling system.

It has been found that less amount of oxygen injected into the slag layer through the oxygen injection nozzle 311, but not penetrating the slag to reach the molten iron enables the electric arc to efficiently transfer the energy to the iron material to melt the DRI with the power input per furnace area higher than 600 KW/m2. A primary purpose of the oxygen injection is not to utilize the thermal energy of oxidizing the molten iron or generate a large amount of FeO, but to maintain the slag characteristic favorable for the electric arc to efficiently transfer the energy to the material to melt with the combination of the feeding of the carbonaceous material such as the lumpy carbonaceous material such as coke or coal. The carbonaceous material fed along with the DRI is captured in the slag to react with the injected oxygen to generate CO gas in the slag. The exothermic heat with the CO generation will increase the slag temperature, which expands and softens (e.g., non-hard consistency) the slag. In addition, the CO gas makes the slag sparse (e.g., dispersed) and maintains the low FeO content less than 5% in the slag. The evolved CO from the slag will blanket the molten iron to maintain the low FeO content in slag even if the electrode casing, the slag discharge door or the roof connection of DRI melting furnace 301 is not well sealed and some oxidants infiltrates into DRI melting furnace 301. To achieve the above, the lumpy carbonaceous material is fed along with the DRI, preferably maintaining more than 30 kg of carbon left in the slag per 1 ton of molten iron.

In producing the hot metal without the foamy slag at DRI melting furnace 301, the slag normally remains dense and thin. Then, the electric arc will be reflected by the dense slag and emitted to the atmosphere with less coverage of the thinner slag, resulting in losing much electric energy by radiation instead of transferring the energy to the molten iron through the slag. Increasing noise level and fluctuating electric current may indicate an unstable operation of the DRI melting furnace with the loss of the electric arc energy emitted to the atmosphere or furnace casing. The temperature increase is also sometimes observed for the cooling water returned from the water jacket installed at the roof or side wall of DRI melting furnace. However, the issue of higher noise and fluctuating electric current can be resolved when desired amount of oxygen injection and lumpy carbonaceous material feeding is implemented to improve the slag characteristics, as mentioned above.

Optionally, to replace some of the carbonaceous material fed and floating in the slag, pulverized carbonaceous material and/or natural gas can be injected through the carbon injection nozzle 312 together with the oxygen to generate CO, so that the slag characteristic would be favorable for the electric arc to efficiently transfer the energy to the material to melt. Preferably, the amount of carbon or natural gas is equal or more than the stoichiometric amount to the injected oxygen in the combustion reaction forming CO2. This will enhance the carburization of the metal captured in the slag by stirring effect of injected oxygen, pulverized carbonaceous material, or natural gas or prevent the re-oxidation of the metal, and will result in reducing the consumption of the carbonaceous material fed along with the DRI.

Still this slag may not be as foamy as the slag observed at a conventional EAF having a FeO content as high as 20% in the slag, but due to the evolved CO this slag is sparse enough to enable the electrical arc to penetrate the slag and expand the slag volume to cover the arc. Furthermore, the slag can better cover the electric arc when the slag amount is larger in feeding the low grade DRI containing much acid gangue. The method comprising the oxygen injection into the slag and the carbonaceous material feed or the injection of the pulverized carbonaceous material or natural gas is more effective in producing the hot metal with the lower grad DRI.

Additionally, to prevent the carbonaceous material floating in the liquid slag from being discharged together with the slag, the upper part of the slag containing the unreacted carbonaceous material may be left in DRI melting furnace 301 while the slag is discharged. In other words, the elevation of the slag upper portion will be maintained above the elevation of the slag tapping hole 309 or the bottom end of the slag door while the slag is discharged, according to embodiments.

To further improve the slag characteristic to achieve the higher efficiency for the electric arc energy transfer to the iron material to melt the DRI, the gas injection to the molten iron bath can be applied through the gas injection nozzle 313 located at the bottom of DRI melting furnace 301. This behaves like the carbonaceous material captured in the slag to generate CO gas when the combustible gas such as natural gas or the reducing gas is injected into the molten iron to evolve from the molten iron and react with the oxygen injected in the slag. The gas injection to the molten iron is also beneficial to stir and better mix the molten iron to increase the carburizing efficiency to improve the yield of the carbon in the DRI and the carbonaceous material externally added. Some unreacted combustible coming off the slag will be discharged in the offgas through DRI melting furnace exhaust duct 308, which contains CO generated in producing the hot metal with the DRI. The offgas containing the combustibles will be utilized as it is or combusted to recover the thermal energy. Or, to more simply and dynamically stir the molten iron and improve the carburizing efficiency, the electromagnetic stirrer 314 can be operated in the molten bath during the hot metal production with the DRI.

Thus, according to embodiments, disclosed is a method and system to maintain the soft and sparse slag characteristic favorable for the electric arc to efficiently transfer the energy to the molten iron with the power input per furnace area higher than 600 KW/m2 while keeping FeO amount less than 5% in the slag and carbon amount higher than 2.5% in the product hot metal at DRI melting furnace 301. The method comprises charging the DRI and additives to DRI melting furnace 301 through DRI melting furnace feed chute 304, injecting oxygen into the slag layer not penetrating the slag or reach the molten iron from the multiple injection nozzles 311 circumferentially laid out, charging the lumpy carbonaceous material fed along with the DRI, discharging the slag through the slag door 309 or the slag tap hole located at the intermediate elevation of furnace side wall, and discharging the product hot metal through the tap hole 310 located at the bottom or lower portion of the furnace. The oxygen may be injected with the sub-sonic gas velocity toward the electrodes from the injection nozzles. The amount of the lumpy carbonaceous material may be more than 30 kg of carbon left in the slag per 1 ton of molten iron. The pulverized carbonaceous material or natural gas may be injected in the slag together with the oxygen. The amount of carbon or natural gas may be equal or more than the stoichiometric amount to the oxygen in the combustion reaction forming CO2. The elevation of the slag upper portion may be maintained above the elevation of the slag tapping hole or the bottom end of the slag door while the slag is discharged, to prevent the carbonaceous material floating in the liquid slag from being discharged with the slag from DRI melting furnace 301. Combustible gas such as natural gas or reducing gas may injected through the injection nozzle 313 located at the bottom or lower portion of DRI melting furnace to stir the molten iron to enhance the mixing and replace some of the carbonaceous material fed along the DRI to efficiently carburize the molten iron. The molten iron bath may be stirred by the electromagnetic stirrer 314 during the hot metal production.

Thus, according to embodiments, disclosed is a method and system to maintain the soft and sparse slag characteristic. Also, according to embodiments, disclosed is a method and system of producing hot metal from DRI using electric arc heating. The method comprises: charging the lumpy carbonaceous material fed along with the DRI to DRI melting furnace 301 through DRI melting furnace feed chute 304; wherein DRI melting furnace 301 includes a slag layer with molten iron therebeneath; injecting oxygen into the slag layer via multiple injection nozzles 311 of an oxygen injector such that the oxygen does not penetrate the slag or the molten iron; discharging the slag through a slag door or slag tap hole 309 located at an intermediate elevation of a side wall of the furnace; and discharging the product hot metal through a metal tap hole 310 located at the bottom or lower portion of the furnace. The soft and sparse slag characteristic favorable for an electric arc of DRI melting furnace 301 to efficiently transfer energy to the molten iron with the power input per furnace area higher than 600 KW/m2 while keeping FeO amount less than 5% in the slag and carbon amount higher than 2.5% in the product hot melt at DRI melting furnace 301 may be maintained.

Thus, in view of the foregoing and according to some embodiments, disclosed is a advantageous method of producing hot metal from DRI using electric arc heating. The method can comprise charging the DRI to DRI melting furnace through a chute; injecting oxygen into the slag layer not penetrating the slag or reaching the molten iron from the multiple injection nozzles circumferentially laid out; charging the lumpy carbonaceous material fed along with the DRI; discharging the slag through the slag door or the slag tap hole located at the intermediate elevation of the furnace side wall, and discharging the product hot metal through the tap hole located at the bottom or lower portion of the furnace.

The method can further comprise maintaining soft and sparse slag characteristic favorable for an electric arc to efficiently transfer energy to the molten iron with the input power density per furnace area higher than 600 KW/m2 while keeping FeO amount less than 5% in the slag and carbon amount higher than 2.5% in the product hot melt at the DRI melting furnace.

Additionally, according to embodiments, the method can include, alone or in any combination, the following features: oxygen can be injected with the sub-sonic gas velocity toward the electrodes from the injection nozzles; the amount of the lumpy carbonaceous material can be more than 30 kg of carbon left in the slag per 1 ton of molten iron; pulverized carbonaceous material or natural gas can be injected in the slag together with the oxygen injection and the lumpy carbonaceous material; the amount of carbon or natural gas can be equal or more than the stoichiometric amount to the oxygen in the combustion reaction forming CO2; the elevation of the slag upper portion can be maintained above the elevation of the slag tapping hole or the bottom end of the slag door while the slag is discharged, to prevent the carbonaceous material floating in the liquid slag from being discharged with the slag from DRI melting furnace; the combustible gas such as natural gas or reducing gas can be injected to stir the molten iron to enhance the mixing and replace some of the carbonaceous material fed along the DRI to efficiently carburize the molten iron; and the molten iron bath can be stirred by an electromagnetic stirrer during the hot metal production.

All herein referenced percentages are in weight percent unless otherwise noted.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, all features, elements and embodiments may be used in any combination.

What is claimed is:

1. A method to maintain a soft and sparse slag characteristic favorable for an electric arc furnace to efficiently transfer energy to molten iron with a power input per furnace area higher than 600 kW/m² while maintaining an FeO amount less than 5 wt. % in the slag and a carbon amount higher than 2.5 wt. % in a product hot metal at a direct reduced iron (DRI) melting furnace, comprising:
    providing an electric DRI melting furnace as an electric arc furnace and including a plurality of electrodes for electric arc heating;
    charging the DRI to the DRI melting furnace through a chute;
    charging lumpy carbonaceous material fed along with the DRI;
    forming a slag layer comprising slag and forming a layer of molten iron below the slag layer;
    providing at least one oxygen injection nozzle for injection of oxygen;
    injecting the oxygen into the slag layer from the at least one oxygen injection nozzle such that no oxygen injected from the at least one oxygen injection nozzle fully penetrates the slag layer to reach the layer of molten iron, thereby generating CO gas and exothermic heat within the slag to expand, soften, and disperse the slag layer;
    adjusting oxygen flow rate to stabilize current fluctuation for each electrode;
    discharging the slag through a slag door or a slag tap hole located at an intermediate elevation of a side wall of the DRI melting furnace; and
    discharging the product hot metal through a tap hole located at a bottom or lower portion of the DRI melting furnace;
    wherein the method maintains the soft and sparse slag characteristic favorable for the electric arc furnace to efficiently transfer energy to the molten iron with a power input per furnace area higher than 600 kW/m² while maintaining the FeO amount less than 5 wt. % in the slag and the carbon amount higher than 2.5 wt. % in the product hot metal at the DRI melting furnace.

2. The method of claim 1, comprising providing multiple injection nozzles circumferentially laid out around the furnace and wherein the oxygen is injected with a sub-sonic gas velocity toward the electrodes from the injection nozzles.

3. The method of claim 1, wherein the oxygen flow rate is controlled to maintain a noise level below 90 dB at the DRI melting furnace.

4. The method of claim 1, wherein the amount of the lumpy carbonaceous material is more than 30 kg of carbon left in the slag per 1 ton of molten iron.

5. The method of claim 1, wherein pulverized carbonaceous material or natural gas is injected in the slag together with the oxygen.

6. The method of claim 5, wherein the amount of carbon or natural gas is equal or more than the stoichiometric amount of the oxygen in the combustion reaction forming $CO_2$.

7. The method of claim 1, wherein the elevation of the slag upper portion is maintained above the elevation of the slag tapping hole or the bottom end of the slag door while the slag is discharged, to prevent the carbonaceous material floating in the liquid slag from being discharged with the slag from the DRI melting furnace.

8. The method of claim 1, wherein a combustible gas, a reducing gas, or an inert gas is injected to stir the molten iron to enhance mixing and replace some of the carbonaceous material fed along with the DRI to efficiently carburize the molten iron.

9. The method of claim 1, wherein the molten iron is stirred by an electromagnetic stirrer during the hot metal production.

10. The method of claim 1, wherein the DRI is made from iron ore containing an iron content <65 wt. %.

11. A method of producing a product hot metal from DRI using electric arc heating comprising:
    charging the DRI along with lumpy carbonaceous material to an electric DRI melting furnace through at least one chute;
    forming a slag layer comprising slag and forming a layer of molten iron below the slag layer;
    injecting oxygen into the slag layer from multiple injection nozzles circumferentially laid out such that no oxygen injected from the multiple injection nozzles fully penetrates the slag layer to reach the layer of molten iron, thereby generating CO gas and exothermic heat within the slag to expand, soften, and disperse the slag layer;
    discharging the slag through a slag door or a slag tap hole located at an intermediate elevation of a side wall of the furnace; and
    discharging the product hot metal through a tap hole located at a bottom or lower portion of the DRI melting furnace;
    wherein the method further comprises maintaining a soft and sparse slag characteristic favorable for an electric arc to efficiently transfer energy to the molten iron with a power input per furnace area higher than 600 kW/m² while maintaining an FeO amount less than 5 wt. % in the slag and a carbon amount higher than 2.5 wt. % in the product hot metal at the DRI melting furnace.

\* \* \* \* \*